United States Patent

[11] 3,578,264

[72] Inventor Arnold M. Kuethe
     Ann Arbor, Mich.
[21] Appl. No. 743,350
[22] Filed July 9, 1968
[45] Patented May 11, 1971
[73] Assignee The Battelle Development Corporation
     Columbus, Ohio

[54] BOUNDARY LAYER CONTROL OF FLOW SEPARATION AND HEAT EXCHANGE
     23 Claims, 27 Drawing Figs.
[52] U.S. Cl. .................................................. 244/41, 244/42
[51] Int. Cl. .................................................. B64c 21/10, B64c 23/06
[50] Field of Search .................................. 244/40, 41, 42, 42.4, 42.62, 130, 35

[56] References Cited
     UNITED STATES PATENTS

| | | | | |
|---|---|---|---|---|
| 2,261,558 | 11/1941 | Orloff | | 244/130 |
| 2,800,291 | 7/1957 | Stephens | | 244/41 |
| 3,072,368 | 1/1963 | Ledden et al. | | 244/41 |
| 3,184,184 | 5/1965 | Dorman et al. | | 244/41 |
| 3,463,418 | 8/1969 | Mihsch | | 244/41 |

*Primary Examiner*—Milton Buchler
*Assistant Examiner*—Jeffrey L. Forman
*Attorney*—Marechal, Biebel, French & Bugg

ABSTRACT: Boundary layer control for delay or prevention of flow separation and/or increase in rate of heat exchange between a surface and a fluid by an arrangement of surface elements which may take the form of either crests or discreet concave depressions in the surface, having effective depths or dimensions of less that of the adjacent boundary layer thickness, to cause the formation of vortices with succeeded surface elements being positioned to cause vortex amplification, for effective boundary layer mixing with less drag, weight penalty, noise, and energy loss than that of conventional vane-type generators.

Patented May 11, 1971
3,578,264
3 Sheets-Sheet 1
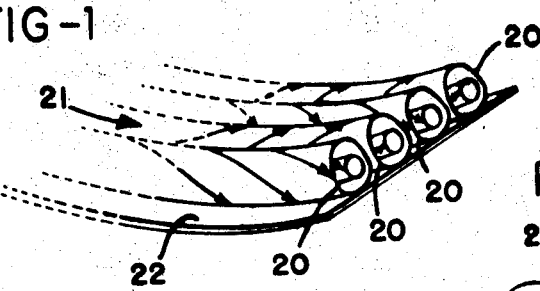
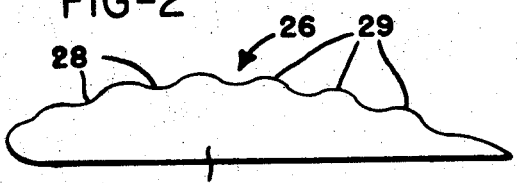
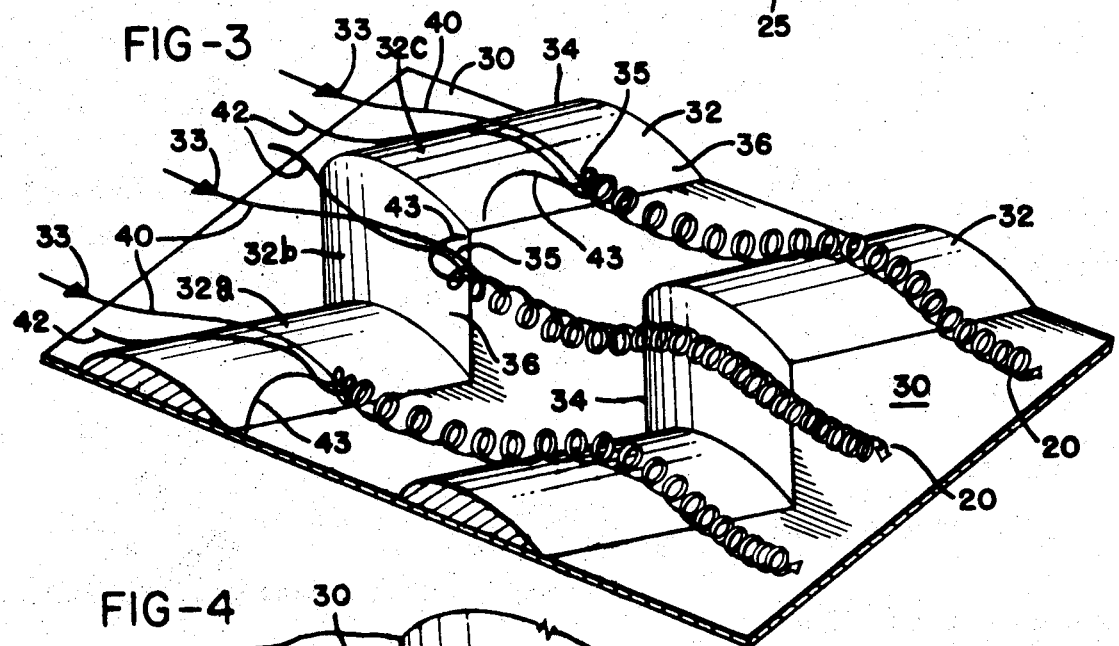
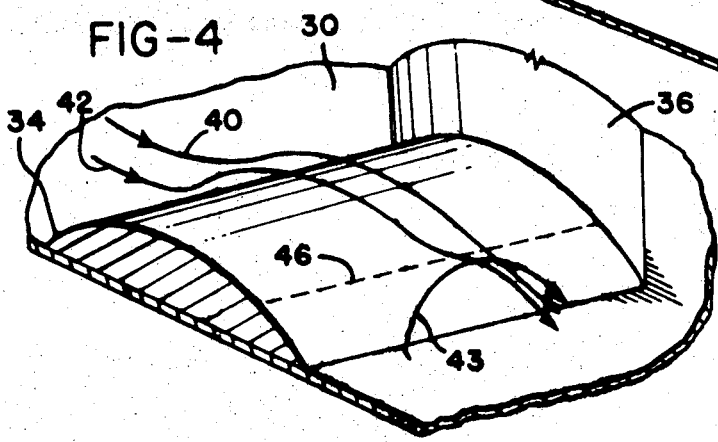
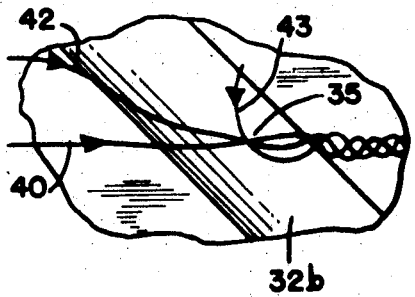
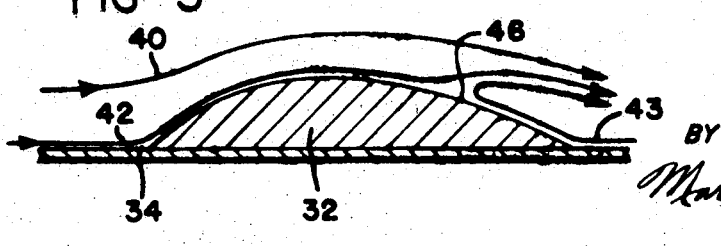
INVENTOR
ARNOLD M. KUETHE
BY
Mareckal, Biebel, Franck & Bugg
ATTORNEYS 3,578,264

BOUNDARY LAYER CONTROL OF FLOW SEPARATION AND HEAT EXCHANGE

BACKGROUND OF THE INVENTION

This invention relates to boundary layer control for the delay and displacement of flow separation and/or for increase in rate of heat exchange over a curved flow-control surface, such as an airfoil or the like, and more particularly to the employment of surface-generated and surface-amplified vortices.

Previous boundary layer control concepts have frequently employed vanes placed normal to the surface and canted relative to the flow direction for the generation of the vortices. The vortices are generated at the tips of the vanes, which are near the outer edge of the boundary layer, so that their energy is drawn from the external stream. As a result, the energy loss will be greater, and the aerodynamic noise will be more intense, than for the present invention in which the vortices are generated and amplified at regions much nearer the surface where velocities are low. In such prior devices, the entire vortex is generated by the vane tip, with no physical mechanism for amplifying the generated vortices. While these vortices so generated are effective, they are often formed at a penalty of weight, cost, noise generation, and energy loss.

SUMMARY OF THE INVENTION

The invention is directed to apparatus in the boundary layer for forming and concentrating vorticity into streamwise vortices, and for amplifying the intensity as they progress along the surface to effect a delay in flow separation.

It is known that when fluid having a viscosity flows past a surface with which it is in contact, the velocity of the fluid in the region adjacent the surface is reduced by friction, and a layer of fluid is formed which has a lower velocity than that of the adjacent stream. This low velocity layer is referred to as the boundary layer, and the depth of the boundary layer is normally defined by the point at which the fluid is moving at 0.99 the speed of the main stream. When this fluid flows from a region of low pressure to a region of high pressure, such as over an airfoil or through a diffuser, the action of the pressure forces it such as to retard the fluid flow. When this becomes sufficiently strong to arrest and reverse the flow of the slow moving fluid in the boundary layer, flow separation results. In referring to airfoils, the flow separation over a large portion of the upper surface is known as the stall.

Vortices have been generated, as mentioned above, to effect mixing of the mainstream flow with the boundary layer to delay flow separation. Streamwise vortices in the boundary layer and extending into the adjacent flow region cause a transfer of streamwise momentum from the exterior flow to the boundary layer immediately adjacent to the solid surface, thus opposing and retarding the onset of flow separation. For the amplification of the streamwise vortices, the present invention makes use of the effect known as the "Taylor-Goertler instability" which results in streamwise vortex generation where a fluid is caused to flow over a concave surface. A second or following properly spaced concave surface results in the amplification of the vortex.

This invention utilizes a wavelike surface, with surface elements of such amplitude, waveform, wavelength, inclination to the flow direction, and such streamwise and lateral distributions of these properties, as to form, and then amplify, streamwise vortices in the boundary layer and adjacent flow region, with the objective of avoiding or delaying the inception of flow separation, with minimum attendant energy loss, drag, and noise generation. The invention may be advantageously applied to any surface in or upstream of a region of incipient flow separation, such as aircraft wings, helicopter rotors, propellers, stator and rotor blades of compressors and turbines, fans, diffusers, bends and irregularities in flow passages, engine inlets, fairings, and the like.

The application of the inventive concept to the control of distribution of heat exchange rate between a surface and an external flow is based upon the interdependence between the heat exchange rate and skin friction.

It is accordingly an important object of the invention to provide a flow control surface in which vortex generators are positioned within the boundary layer and form vortices near the surface, and arranged in such a manner as to amplify the vortices in a streamwise direction.

A further important object of the invention is the provision of apparatus by which surface-generated vortices are amplified by the employment of one or more of a succession of contoured vortex augmenting surfaces, which may be either protuberances or concavities.

A still further object of the invention is the utilization, in a flow control surface, of Taylor-Goertler vortices together with amplification thereof and boundary layer control of flow separation. These and other objects and advantages of the present invention will be apparent from the following description, the accompanying drawings, and the appended claims.

BRIEF DESCRIPTION OF THE DRAWINGS

FIG. 1 is a perspective view of the amplification of vortices by flow over a concave surface;

FIG. 2 is a diagram of an airfoil constructed according to this invention;

FIG. 3 is an enlarged isometric view of a surface formed with an array of elements in accordance with a further form of the invention and showing the surface generation, followed by amplification, of streamwise vortices;

FIG. 4 is a further enlarged isometric diagram of a fragment of one of the surface elements of FIG. 3;

FIG. 4A is a plan view of a portion of FIG. 3;

FIG. 5 is the projection of the streamlines on a plane normal to the axis of a surface element;

FIG. 13 is a diagram showing the invention as applied to a compressor, turbine or fan blade and also illustrates the manner in which the invention may be applied to a helicopter rotor blade or the like;

DESCRIPTION OF PREFERRED EMBODIMENTS

Figure 6:
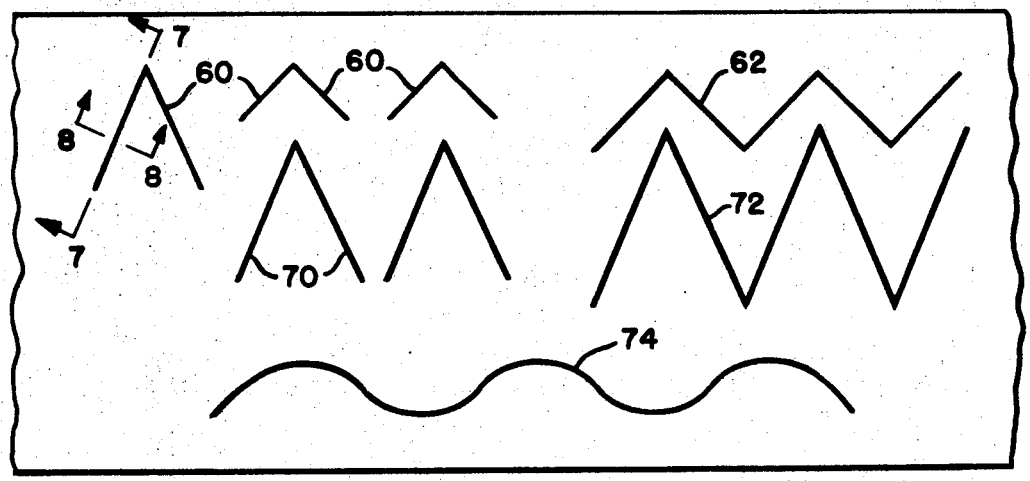
FIG. 6 is a plan diagram showing typical arrays of either crest or trough-type elements positioned on a surface in accordance with this invention.

An array of streamwise vortices 20 of alternating sign is shown in FIG. 1 as formed or developed by air flowing in the direction of arrow 21 over a concave surface 22. The vortices 20 have a low rate of viscous decay and are only slightly attenuated as they pass over a succeeding convex surface of curvature. A second concave surface 22 in the direction of flow 21 causes an amplification of the vortices 20. Thus, on a given surface, if the wave amplitude, waveform, wavelength, inclination to flow direction, and streamwise and lateral distributions thereof are optimum, the vortices 20 may be caused to undergo a maximum net amplification after traversing a given distance along such a wavy surface.

FIG. 2 is a cross-sectional diagram of a lifting or thrusting surface, such as an airfoil 25 showing schematically a wavy upper surface 26 comprising a series of separate surface elements defined by concave segments or depressions 28 followed by convex segments 29, defining thereby a spaced series of concave portions for vortex generation and amplification, separated by a corresponding series of convex portions, over which the amplified vortex will be only slightly attenuated.

A further example of wave element structure by means of which vorticity within the boundary layer may be concentrated and directed into the formation of streamwise vortices 20 is shown in FIG. 3, and diagrammed in FIGS. 4 and 5. The surface 30 is formed with, or has formed thereon, a series of semicylindrical crest or wavelike elements 32 which are positioned generally transversely to the direction of fluid flow, as illustrated by the arrows 33. The elements 32 are arranged in alternate or angularly disposed sections 32 A, B, C, etc. in a somewhat zigzag manner, so that the leading edges 34 thereof are not normal to the flow direction but are at some inclination thereto. In this manner, the formation of vortices of opposite signs is assured.

The flows over the forward and rear slopes of the wave elements 32 are such to concentrate the vorticity of the boundary layer into a vortex sheet 35 over the lee side 36 of the wave elements 32, with the sense of rotation of the sheets alternating from one section to the other. Since the vortex sheet thus formed is unstable, the sheets behind each elements roll up as shown in FIG. 3, into an array of vortices 20 of alternating signs of rotation.

The vortices thus formed are amplified in the concave valleys defined by the lee or trailing surface 36, the leading surface of the following element 32 and the intermediate surface 30. Any tendency of the succeeding wave crests to cause decay is counteracted by the same tendency to concentrate the vorticity which resulted in the original formation of the vortices aft of the leading crests. The amplification is indicated in FIG. 3 by the tightening of the spirals over the succeeding crests of the elements 32 following formation and amplification, as described. The vortices 20 are effective to promote boundary layer mixing in much the same manner as by the vortices generated by known blades or vanes, but with less energy absorption, noise and drag.

The lateral displacement of the inclined segments 32 A, B, C, etc. are positioned with respect to the corresponding such segments in the preceding and succeeding elements in such a manner that a given vortex will always tend to pass over an element 32 which is canted in the same direction. An element 32 canted in the opposite direction would tend to damp, rather than amplify, the vortex. Further, the tendencies of vortices of the same senses of rotation to roll into a single vortex, and conversely the tendency of vortices of opposite sense adjacent to a surface to separate from each other, will tend to guide the vortices to those wave elements 32 which are canted in the direction to amplify their strengths. The flow will thus automatically tend to compensate for misalignments in the staggering of the elements in successive arrays.

Reference may be had to FIGS. 4, 4A and 5 for a fuller understanding of the manner in which the vortex is created by a crest-type surface element 32. Streamline 40 is at the outer edge of the boundary layer, streamline 42 is adjacent to the surface upstream of the crest, and streamline 43 is (initially) adjacent to the surface 36 downstream of the crest. The pressure gradients associated with the flow over the crest cause deflections of these streamlines, as follows. As surface streamline 42 approaches the upstream edge 34 of the wave element, it is deflected toward parallelism with edge 34. As it flows over the element 32 its deflection decreases until the pressure minimum is reached, when its deflection increases again as it approaches the line 46 of flow reversal of the chordwise component, where it lifts from the surface. External streamline 40, being subjected to the same lateral pressure gradients as line 42, deflects in the same way but to a much smaller degree because the momentum of the external flow is much greater than that adjacent to the surface. Surface streamline 43 also deflects with the wave inclination, and if the chordwise component of the pressure gradient is great enough, the chordwise component of the flow reverses and the streamline 43 lifts from the surface at its point of closest approach to 46.

The projections of the streamlines on the chordwise plane normal to the surface (i.e., the plane normal to the axis of element 32) will then have the conventional configuration shown in FIG. 5 for reversal of the chordwise component of the flow. The amplitude, cant, and wavelength of the element 32 is designed to provide a sufficiently large spanwise flow component that the direction of the total flow does not reverse relative to the external streamline 40. Therefore, a turbulent wake with the attendant high energy loss, which is the usual result of flow separation, need not occur on the lee side 36 of the element 32. The vortex sheet 35, which forms where lines 40, 42 and 43 intersect the same chordwise plane, as shown in FIG. 4A, rolls up into the streamwise vortex 20 shown in FIG. 3.

The Taylor-Goertler instability of flow in a boundary layer on a concave surface results from the circumstance that, when a fluid element in equilibrium (i.e., centrifugal and pressure forces are equal) is displaced normal to the streamlines, the restoring force (the difference between centrifugal and pressure forces at the new position) is negative, that is, in the direction to displace the element farther from its equilibrium position. The theory shows that, as a result of the instability of the flow over a concave surface, the array of vortices 20 of FIG. 1 is formed and it predicts their rate of intensification as a function of surface curvature. Smith (Quarterly of Applied Mathematics, Vol. XIII, No. 3, Oct. 1955) compared his theoretical results with experiments on wings and found that transition from laminar to turbulent boundary layer occurs in a region of concave curvature when the calculated amplification reaches a value of $2.718^{10} = 20,000$ times. The theory takes into account only first-order effects, and viscosity of the fluid is neglected; if these effects could be calculated they would show a tendency toward defining an upper bound well under 20,000 times for the amplification. Nevertheless this high value indicates that streamwise vortices are initially greatly intensified when they traverse a surface with concave curvature.

The formation of the streamwise vortices does not require that the boundary layer be laminar; the instability phenomenon is found to be remarkably insensitive to the velocity distribution, so that the application of the analyses to the rate of amplification of streamwise vortices in turbulent boundary layers is expected to be valid to a first approximation.

The streamwise vortices 20 will form most readily if the properties of the wave elements 32 are such as to bring about reversal of the chordwise flow component as shown in FIGS. 4 and 5. However, if the amplitude of the surface waviness is small, or if its shape is such that the windward slope is high and the leeward gentle, chordwise flow reversal will not occur. Under these circumstances, at the Reynolds numbers of most applications, the chordwise vortices will still form, but now as a result of a flow instability closely related to the Taylor-Goertler type; this instability in a three-dimensional flow results from an imbalance between centrifugal and pressure forces on boundary layer fluid elements displaced parallel to the solid surface. The vortices, formed purely as a result of this instability, will tend to be weaker than those involving reversal of the chordwise component as well, but, if the adverse pressure gradient is not steep (i.e., if on a wing the angle of attack is not more than 4° above the "clean surface" stalling angle) and if the inverted V or sawtooth element arrays begin approximately 5 to 10 times the boundary layer thickness upstream of the "clean surface" separation point, the amplification by both types of centrifugal instability will still provide effective delay of flow separation.

Figure 7:
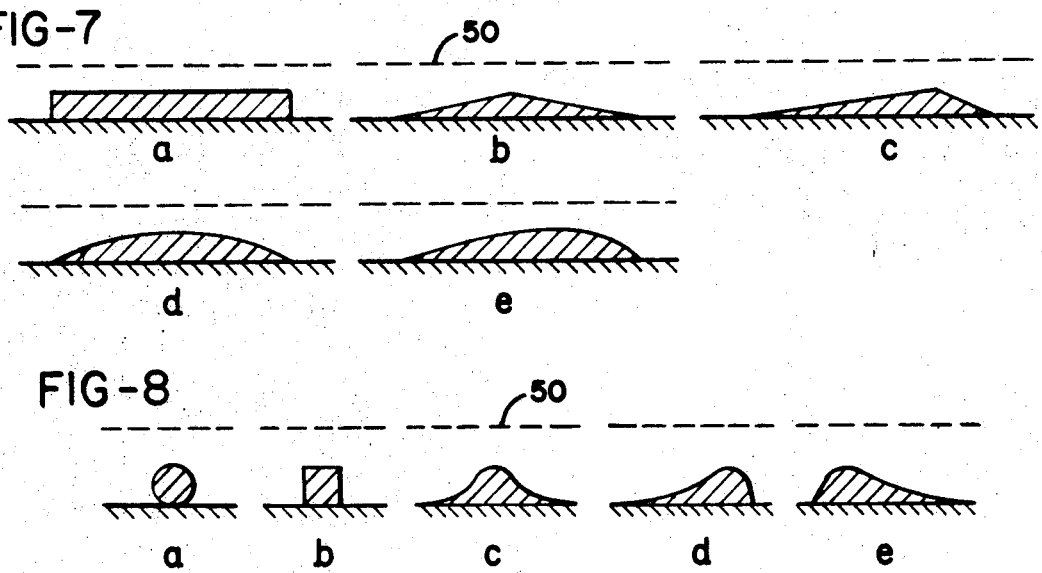
FIGS. 7A—7E show a series of longitudinal sections through typical crest-type surface elements, as may be taken along the line 7—7 of FIG. 6.
Figure 8:
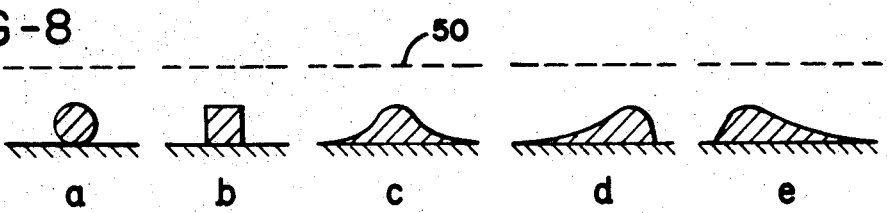
FIGS. 8A—8E are a series of typical cross-sectional views of crest-type surface elements, as may be taken generally along the line 8—8 of FIG. 6.
Figure 9:
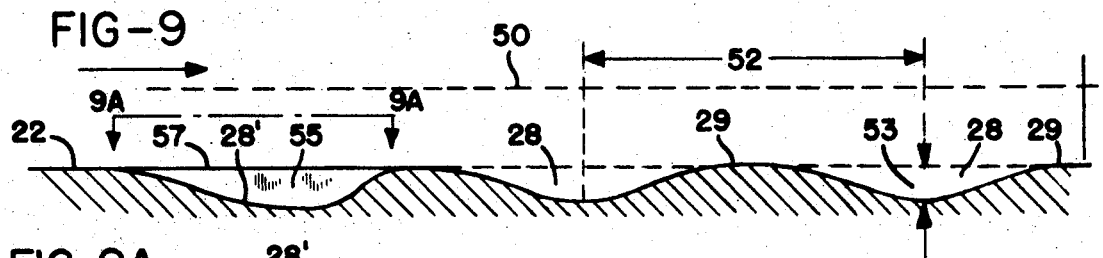
FIG. 9 is a cross section of a series of trough-type surface elements.
Figure 9A:
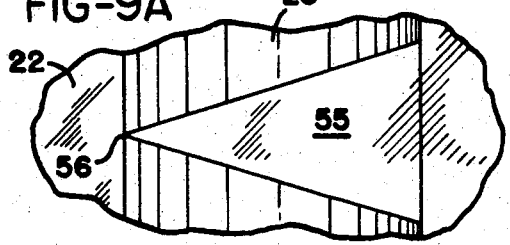
FIG. 9A is an enlarged plan view looking along the line A—A of FIG. 9.

Reference may be had to the several views of FIGS. 7, 8 and 9 for various configurations of surface elements 32 which may be used to produce and amplify the vortices 20 in accordance with this invention. In each of these figures, the cross-sectional views of various configuration of the elements 32 are shown in relation to a typical boundary layer δ identified by the broken lines 50. Thus, FIG. 7A represents a longitudinal section through an element 32 which is of constant height throughout its length. However, the height of the element may vary longitudinally of its length, for example to a peak midway of its length as shown in FIG. 7B, or to a longitudinally offset peak as shown in FIG. 7C, or have a symmetrical transverse convex surface as shown in FIG. 7E. The choice of element height in a longitudinal sense, as represented by the several examples given in FIGS. 7A—E, would be chosen for the particular application in order to achieve optimum effect on flow separation or heat transfer with minimum penalty and energy loss or sound generation. The greater height will necessarily result in a deeper following concave surface for vortex generation or amplification. It will be noted that the height, in each case, is preferably less than the anticipated boundary layer thickness as indicated at reference line 50.

Cross-sectional shapes of positive, convex, or crest-type elements 32 may also be varied, as indicated by the several examples of FIG. 8. In FIG. 8A, the element is shown as being round, and in FIG. 8B it is square. FIGS. 8C, D and E show variations in convex cross-sectional shapes, in which FIG. 8C more closely resembles the example of the element 32 of FIGS. 4 and 5. FIG. 8D shows such an element with a sloping front surface and a rapidly dropping rear surface while the opposite configuration is shown in FIG. 8E. Again, the choice of cross-sectional shape will depend on the particular application, and other factors, such as convenience of material. The cost of duplication, may also be important. In each configuration, it is seen that the element has a trailing surface which forms with the adjacent surface 22 a generally concave section for vortex generation and amplification.

As shown in FIG. 2, the vortex generating structure comprises concavities formed on or in a primary air control surface. A modified arrangement is shown in FIG. 9 in which the surface undulations form alternate concavities 28 and crests 29 having a periodic spacing 52 which may be in the order of about 10δ, but may vary between 5—20δ. The depth 53 is preferably less than the boundary layer thickness. The leading trough 28' is formed of a somewhat different construction, for more positive vortex formation, and includes a series of longitudinally-spaced, wedge-shaped fill plates 55. The apex 56 of a plate 55 faces forwardly, and the upper surface 57 is coterminous and coplanar with the surface 22 across the top of the trough 28' so that the plate 55 does not project into the airstream or into the boundary layer. Whether plate 55 is formed with sharp right-angle or slightly rounded side edges will not affect critically the strengths of the vortices generated.

It is within the scope of this invention to employ troughs or surface depressions 28 in lieu of positive protruding elements 32 as shown in FIGS. 7 and 8, and throughout the embodiments of FIGS. 6 and 10—15, it is intended that the illustrative positioning of the arrays of elements refers to either type of vortex generating construction, that is, either convex 32 or concave 28.

FIG. 6 shows a typical array of the elements 32 or 28 in which the elements are arranged in individual chevrons 60, on the left-hand portion of FIG. 6, and in a continuous zigzag arrangement 62 on the right-hand side. A second array of chevrons 70 is positioned downstream of the first array 60 and provides vortex amplification. Similarly, a continuous zigzag array 72 is positioned downstream of the array 62 for the same purpose. It is not necessary that the elements themselves lie in straight lines as in the examples 62, 70 and 72. Accordingly, a third array may comprise a wavy line 74 positioned in common to the arrays 60—70 and 62—72, in a downstream related manner, for further net amplification of the vortices.

Figure 10:
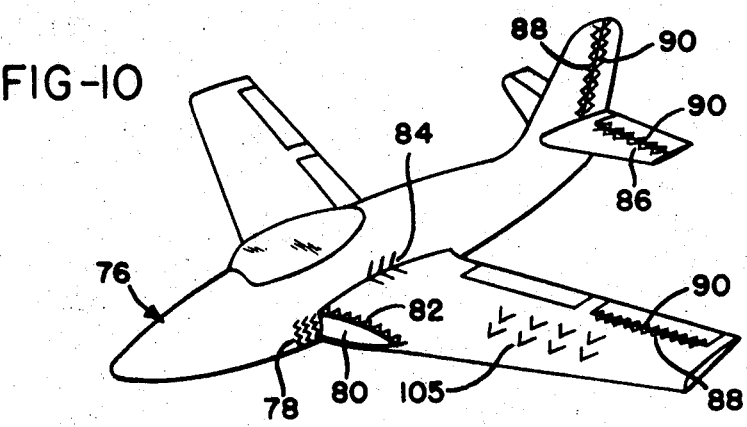
FIG. 10 shows the application of the invention to an aircraft.

FIG. 10 shows several applications of the present invention to an aircraft 76. A series of sawtoothlike element arrays 78 may be positioned just ahead of an engine inlet duct 80 to prevent separation as the air approaches the inlet, while a further array 82 may be positioned just downstream of the relatively sharp inlet lip of the engine inlet 80 to prevent separation at high angles of attack. A further series of arrays indicated at 84 in FIG. 10 at the wing-fuselage junction deflect boundary layer air and generate and amplify vortices to prevent separation at this junction. Similar arrays could be used at the junction of the horizontal and vertical stabilizer surfaces.

Separation at the movable surfaces, such as flaps, ailerons, etc. may be prevented by sawtooth arrays of the type 60—70 or 62—72, with the first row being positioned ahead of the hinge point, as shown at 88. A second row 90 is positioned downstream of the hinge point.

Figure 11A:
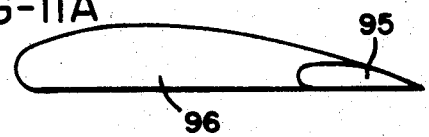
FIGS. 11A and 11B are sectional and perspective views respectively of a portion of a wing and flap.
Figure 12A:
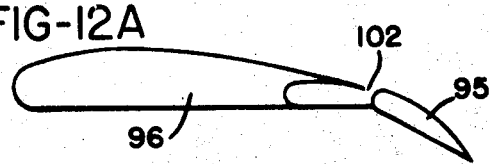
FIGS. 12A and 12B show the corresponding parts of FIG. 11 with the flap in the deflected position.
Figure 11B:
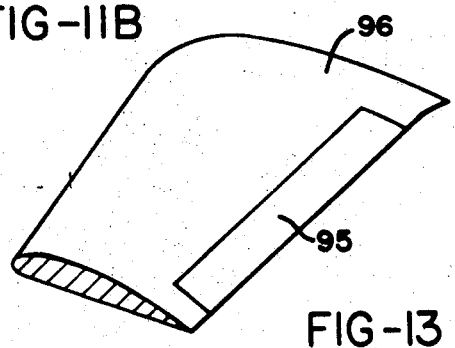
Figure 12B:
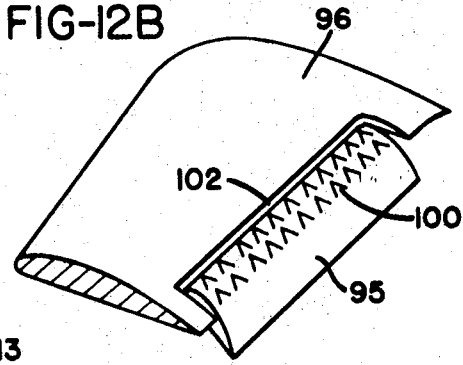

FIGS. 11 and 12 show a particular manner in which the teachings of this invention can be applied to a wing and flap in which a Fowler-type or slotted flap 95 is mounted on a wing 96. In FIGS. 11A and 11B the flap 95 is in its fully retracted position into the wing 96. In this position, none of the arrays is exposed. However, as shown in FIGS. 12A and 12B, double chevron rows of elements are positioned at 100 adjacent the leading edge of the flap, and in this manner cause the flow emerging from the slot 102 to flow along the upper surface of the flap 95 instead of separating. Further arrays 105 may be used on the upper surface of the wing (FIG. 10) to delay flow separation in whatever regions are found to be the lowest angle of stall.

In any of the applications of the inventions to the embodiments described above, the wave configuration, that is its length, planform and longitudinal and cross-sectional shape of the elements, downstream spacing, and whether crests 32 or troughs 28 are used, would be based upon considerations of surface geometry, boundary layer thickness, previous flow history, and pressure gradient. For example, the arrays 100 on the wing flap 95 might be more readily accommodated within the wing in the undeflected configuration of FIG. 11 if the generators used were of the trough type.

When using a succession of arrays, such as 60—70 and 62—72 of FIG. 6, the elements would be oriented so that at high angles of attack the streamlines near their crests bisect the angles of the V or sawtooth elements. This precaution would be particularly important for minimizing the wave drag in transonic or supersonic applications. In some instances, however, the change in flow direction through the boundary layer may be so great that some wave drag cannot be avoided. Under these circumstances retractable arrays may be used, or a construction similar to that of the "deicer boot" of older aircraft would permit inflation of the arrays when the configuration of incipient separation is approached, such as in the landing approach.

Figure 13:
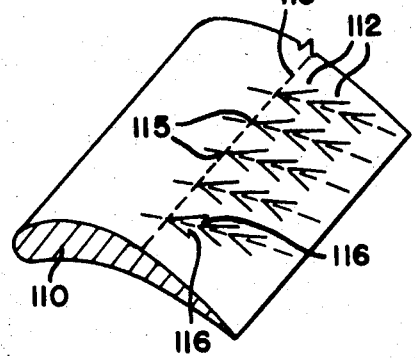

FIG. 13 represents the application of the invention to a heavily loaded blade of a compressor, turbine or the like. If lightly loaded, the blade 110 might be that of a fan, propeller or helicopter rotor. The vortex generator arrays 112 are shown as being positioned in the region of transonic flow, in the case of a compressor in which the compression shock occurs somewhere between the leading edge 113 of the arrays and the trailing edge, depending upon the relative Mach number of the blade elements. In this embodiment, the generators are shown as a series of V-shaped elements substantially as indicated at 60 and 70 in FIG. 6, and the streamlines 115 near the top of the generator element bisect the acute angle formed by the elements in each array, in such a manner that the half angles 116 are less than the angle the sine of which is the reciprocal of the local Mach number at the edge of the boundary layer.

Figure 14:
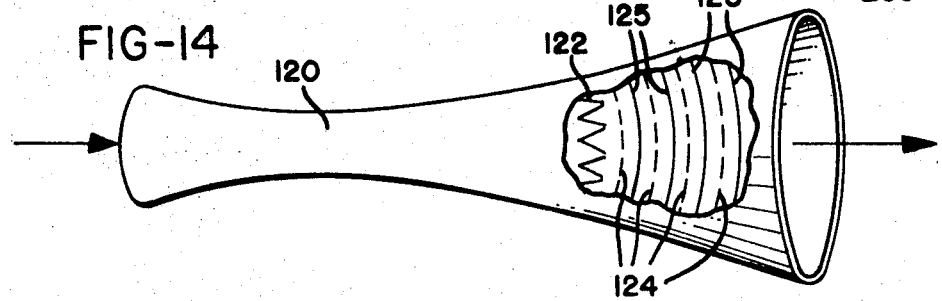
FIG. 14 shows the application of the invention to a diffuser.

FIG. 14 shows the application of the present invention to the inside surface of a diffuser 120. In this embodiment, as in others, a combination of elements may be used, such as V-shaped crest elements 122, followed downstream by internal circular arrays of alternating troughs 124 and crests 125. Any combination of these elements may be used in order to provide the desired flow separation delay. In some cases, it may be preferred to position the first array 122 of vortex generators ahead of the diffuser throat, with the waviness defined by the elements 124 and 125 following downstream. In this manner, the generation of the vortices, itself, will not excite flow separation.

By means of these separation control arrangements, the fineness ratio (length over maximum diameter) for minimum drag of bodies of revolution (submarines, airships, torpedoes, aircraft tip tanks, engine nacelles, etc. can be decreased with resultant decrease in overall drag and structural simplification, resulting from the increase in volume to surface area ratio. Since the use of the V or sawtooth wave arrays would permit a rapid decrease in diameter aft of the maximum section without causing flow separation, further drag reduction would be facilitated through the resulting increase in the relative area of laminar versus turbulent boundary layer.

As a specific example of the application of the teachings of the present invention to a surface, a symmetrical airfoil shape of 15-inch chord, 17-inch span, with end plates 22 inches in diameter was mounted on a turntable near the center of the cross section of a wind tunnel, the orientation of which could be varied continuously from outside the tunnel. The wind speed was 125 ft/sec and the Reynolds number was $10^6$.

The vortex generators consisted of rod type elements, FIGS. 7A and 8A, arranged in a single V-shaped row, such as at 60 in FIG. 6. The rods making up the arms of the V's were 0.1 inch in diameter, 1.8 inches long; the total included angle of the V's was 25° and their spanwise spacing was 1.2 inches.

The clean wing was stalled near the midspan and midchord at an angle of attack $\alpha$ of 14.7°. The vortex generators were then attached to the surface with the apex of the V's at 4.5 inches from the leading edge. The flow near midspan was installed until $\alpha = 19.5°$ and even then the stall was limited to the region near the trailing edge. The wave-type vortex generators delayed the stall by around 5°, leading to an increase in maximum lift coefficient of about 0.5. The quantative results were altered somewhat by spanwise flow from the endplates at the highest angles of attack, but the use of the vortex generators lead to an increase in maximum lift.

The test yielded the following design information: One array of inverted V-type generator with height equal to 0.5 $\delta$, length equal to 9 $\delta$, total included angle of 25°, and spanwise spacing of 6 $\delta$, with midpoint located at 0.36 chord, delayed the stall of the wing by about 5°, thus increasing the maximum lift coefficient by about 0.5 over that of the wing without generators.

Considering amplification of the spanwise vortices when they traverse a concave region, the above performance could be improved by adding one or more arrays of approximately the same dimensions at chordwise spacings of 2 to 3 inches. On the other hand, the above performance could be equaled, with resulting decrease in drag increment, by using about three arrays with element height of about 0.25 $\delta$ and chordwise spacings of 1.5 to 2 inches.

The tests show that effective delay of flow separation can be achieved with this type of vortex generator at a ratio of generator height to boundary layer thickness of around half that recommended for the vane-type generator.

At transonic and supersonic speeds the sawtooth or inverted V-shaped arrays of FIG. 6 would be particularly advantageous because the line of the crests could be swept behind the Mach angle $[\sin^{-1}(1/M)]$ for the maximum Mach number to be attained; thus the wave drag would be eliminated or reduced to a minimum. Therefore, for instance, on a lifting surface where vortex generation may be needed to delay flow separation at low speeds, the drag penalty at high speeds would be minimized.

When used on compressor and turbine stator and rotor blades, as in FIG. 13, the generators can be used to avoid flow separation, particularly on blades designed for high loading. Even at low loadings however they would be effective in delaying or avoiding the "shock stall" at those radial positions where the relative flow is transonic. At these locations the V or sawtooth wave elements 32 applied to the blade upstream of the shock location will avoid flow separation in the region of rapid pressure recovery associated with the shock. The elements of the arrays would all be swept behind the Mach angle of the flow upstream of the shock.

In all of the applications at transonic and supersonic speeds minimum drag penalty would result if care is exercised so that at no point will any streamline encounter a compression turn greater than the Mach angle. One possibility for minimizing the drag penalty would be to fair the elements gently into cusps of zero amplitude a the leading and trailing points.

The invention is useful in preventing or delaying flow separation in the flow around elbows or the like in enclosed conduits or other confined flow passageways, by the placement of suitable generators in the wall of the conduit ahead of the region of flow separation. Further, the invention may be employed to prevent or delay flow separation at reentrant corners in space vehicles, such as the junction of the body and a flare in the surface of missiles and the like.

The apparatus is useful in increasing the rate of heat exchange between the fluid and the surface, as well as the delaying flow separation. This use stems from the circumstances that any increase in mixing between the external flow and the fluid layers adjacent to the surface will increase the heat exchange between the fluid and the surface as well as delay flow separation. Thus, not only will the separated flow region with its very low heat exchange rate be avoided but, in addition, the heat exchange rate can be increased over the entire wetted area by the introduction of streamwise vortices. For this purpose, the entire surface could be rendered wavy as shown in FIGS. 2 and 9, for example, in which case the amplitudes need be only about one-third or less of the boundary layer thickness. If the heat exchanger incorporates closely spaced parallel sheet metal fins, V or sawtooth waves 32, with semiapex angles 116 (FIG. 13) of 20° to 40° could, for instance, be stamped into them.

Figure 15:
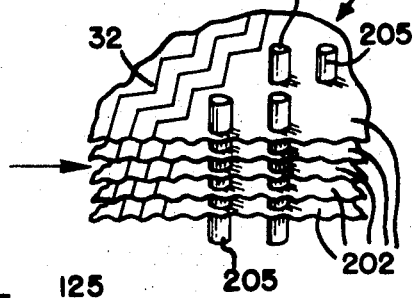
FIG. 15 is a somewhat diagrammatic view of a heat exchanger embodying this invention.

A heat exchanger incorporating principles of the invention is shown at 200 in FIG. 15. The exchanger 200 employs a plurality of closely spaced parallel sheet-metal fins 202 in which the V or sawtooth waves 32 are formed. The semiapex angle as identified at 116 in FIG. 13, may be between 20°—40°, and the wave elements may conveniently be stamped into the fins 202, thus forming positive crests on one side of the sheet and negative crests on the opposite surface. It is preferable, in stacking the heat exchanger fins 202, to position them so that a crest on one sheet is opposite a valley on the next adjacent sheet, although this is not critical.

The coolant tubes 205 extend through, are positioned normal to, the fins 202, and preferably have a fineness ratio which is greater than unity with the long axis thereof in the direction of the main stream. The wave elements 32 and tubes 205 are preferably spaced so as to form a pair of vortices between each pair of tubes.

The wave elements on the fins 202 will form and amplify an array of streamwise vortices with alternating senses of rotation. If the boundary layer Reynolds number is about 500 or above, the vortices generated cause transition to turbulence to occur, and the heat exchange rate is substantially increased over that of a conventional heat exchanger. In other words, the longitudinal vortices will increase the rate of heat exchange whether the boundary layer is laminar or turbulent, and, if laminar, the effect of the vortices induces transition to turbulence, causing a further increase in heat exchange rate. The coolant tubes 205 are subjected to an appreciable axial flow component as a part of the vortex flow field. The resulting inclined flow field will tend to retard flow separation and further increase the heat exchange rate.

It is accordingly seen that this invention provides vortex generating means positioned within the boundary layer and effective to prevent flow separation or to delay such separation, of a fluid flowing over a curved surface. Generators within the boundary layer may take the form of either surface concavities, or crests which define concavities on the downstream side thereof, and being arranged in arrays so that succeeding arrays effect amplification of vortices generated by preceding arrays. The vortex generators of the present invention are accordingly particularly adapted for employment on axially symmetric and other three-dimensional bodies, in diffusers and curved passages, on control surfaces, on compressor and turbine blades, and the like, at subsonic, transonic, and supersonic relative speeds where drag, noise generation, space, cost and weight penalty associated with vane type generators are not warranted or feasible. The dimensions and configurations of the zigzag or V-shaped arrays should be designed for maximum utilization of the boundary layer vorticity (by rotation of the boundary layer vorticity vectors to the streamwise direction) in the formation of the downstream vortices to delay flow separation and/or increase heat exchange.

By comparison, the vane-type device, which projects more than twice as far into the flow, depends, for vortex formation, on the lift generated by the vanes. Therefore, for equal effectiveness in delaying separation, the power loss for vortex formation along will, because of the drag due to lift and vane profile drag, be much greater than for the present invention. In addition, the present invention provides efficient means for vortex amplification.

While the forms of apparatus and methods herein described constitute preferred embodiments of the invention, it is to be understood that the invention is not limited to these precise forms of apparatus and methods and that changes may be made therein without departing from the scope of the invention which is defined in the appended claims.

I claim:

1. Apparatus for the displacement or delay of the inception of flow separation of a fluid flowing over a curved surface, comprising means defining a plurality of elements formed on said surface and defining with said surface concave vortex generating regions, with some of said elements being arranged in arrays defining a plurality of rows oriented generally transversely to the direction of flow with said rows being spaced in downstream relation to other of said rows a distance of between five and twenty times the boundary layer thickness to effect vortex amplification, and said elements each having an effective height defining said concave regions which is less than the thickness of the adjacent boundary layer.

2. The apparatus of claim 1 in which at least some of said elements form crests on said surface oriented generally transversely to the direction of flow and defining on their downstream side said concave regions.

3. The apparatus of claim 2 in which said crests have a height equal to approximately one-half the boundary layer thickness.

4. The apparatus of claim 1 in which at least some of said elements are formed by means in said surface defining troughs having their axes oriented generally transversely to the direction of fluid flow.

5. The apparatus of claim 1 in which the elements in each said row are positioned at an angle to each other and to said direction of flow in alternating zigzag fashion to form an array of said elements which generate adjacent vortices of opposite signs.

6. The apparatus of claim 5 in which the elements of a downstream row are placed so as to intercept and amplify vortices of the same sign as generated by those of an upstream row.

7. The apparatus of claim 1 in which said arrays alternate between crests and troughs in the direction of fluid flow.

8. The apparatus of claim 1 in which said elements are arranged in a series of V-shaped arrays on said surface in which the apex of said arrays are oriented toward the direction of fluid flow and in which streamlines in the flow bisect the included angles of said arrays.

9. The apparatus of claim 8 in which the half angle of said bisected angle is an acute angle and is less than the angle the sine of which is the reciprocal of the local Mach number at the edge of the boundary layer.

10. The apparatus of claim 1 further including an aircraft wing, a Fowler-type flap movable on said wing between a retracted position in which a surface portion of said flap is recessed into said wing and an extended position in which said flap portion is exposed and defines with said wing a transverse slot, and in which said elements are formed on said flap surface portion.

11. Vortex inducing apparatus in combination with a fluid control or flow directing surface for generating vortices by utilizing the energy represented by the boundary layer vorticity upstream of the apparatus so as to cause mixing of mainstream fluid with boundary layer fluid downstream of the apparatus, comprising at least one elongated flow diverting element arranged in superimposed relation with respect to said surface and having a height proportioned to extend partially into the boundary layer and having a length which is substantially greater than the upstream boundary layer thickness extending in a direction generally transversely but inclined at an angle other than 90° to said mainstream flow and being formed with a downstream surface defining a correspondingly transversely oriented concavity with said flow control surface in which the direction of flow of some of the streamlines closely adjacent said downstream surface is deflected to a greater extent than the streamlines in the boundary layer more remote from said downstream surface to generate rotation of said streamlines resulting in a trailing vortex substantially within the dimensions of the original upstream boundary layer.

12. The apparatus of claim 11 in which said element extends transversely along a generally straight line.

13. The apparatus of claim 11 further comprising a plurality of said elements arranged relatively transversely one to the other for forming a corresponding plurality of individual vortices.

14. The apparatus of claim 13 in which said elements are formed separately from said flow control surface with a generally cylindrical upper surface and a generally flat bottom surface for attachment to said flow control surface.

15. The apparatus of claim 13 in which said elements are of uniform cross-sectional dimensions throughout their length.

16. The apparatus of claim 15 in which said elements extend transversely along generally straight lines.

17. The apparatus of claim 13 in which said plurality of elements are formed in adjacent pairs inclined oppositely from each other in relation to said mainstream flow and joining at a common apex oriented toward the direction of flow for forming a pair of adjacent vortices of opposite sign.

18. The apparatus of claim 17 adapted for use in a supersonic flow environment in which said pairs of elements define therebetween an included angle less than the Mach angle of the mainstream flow upstream of said elements.

19. The apparatus of claim 13 in which said elements are arranged with respect to said mainstream flow with alternating inclinations thereto in a generally zigzag manner to form a corresponding array of adjacent vortices of alternating signs.

20. Apparatus for delaying flow separation of air forming over a curved flow control surface by creating vortices from a region within the boundary layer by utilizing the boundary layer vorticity to mix mainstream flow of air with boundary layer air and impart energy to said boundary layer air, comprising a transversely oriented series of essentially rigid elongated flow diverting elements mounted in superimposed relation to said surface, each of said elements having a height proportioned to extend only partially into the boundary layer and each having a length which is substantially greater than the boundary layer thickness extending on said surface generally transversely to said mainstream flow but inclined at an angle to said flow other than 90°, and each being formed with a downstream surface which defines a correspondingly oriented concavity with said flow control surface, said elements being positioned on said flow control surface upstream of the region for which flow separation is desired to be delayed and having a width in the direction of flow which is substantially less than said transverse length and being of generally uniform cross-sectional dimension throughout the length thereof for effecting a reversal of the direction of flow of some of the boundary layer streamlines projected on a plane to the axis of said element closely adjacent said concavity and further affecting a deflection of streamlines within the boundary layer which are more remote from said concavity so as to generate a series of trailing vortices, one for each of said elements, said vortices being generated substantially within the dimension of the original boundary layer.

21. The method of delaying or preventing flow separation in fluid flow over a curved flow control surface comprising the steps of placing a surface element entirely in the boundary layer to form a streamwise vortex at a discrete upstream location within the boundary layer and placing additional said surface elements at downstream locations to intercept and amplify such vortex at such downstream locations on said surface within the boundary layer.

22. The method of mixing boundary layer fluid with a mainstream of fluid moving along a fluid controlling surface, comprising the steps of forming a transverse discrete condition on said surface entirely within the boundary layer and along a spanwise extent of said surface which extent is substantially greater than the boundary layer thickness and at an angle of other than 90° to the direction of mainstream flow creating a corresponding extended spanwise concavity which is also inclined to the direction of flow of said mainstream at an angle other than 90°, said concavity causing a differential deflection of the streamlines within the boundary layer along the length thereof so that the energy represented by the boundary layer vorticity is diverted into the formation and enhancement of a vortex substantially within the dimensions of the original boundary layer, said vortex trailing off downstream from said transverse concavity.

23. The method of mixing boundary layer air with a mainstream of air moving over an air controlling surface, comprising the steps of placing an elongated element on said surface entirely within the boundary layer and orienting said element at an angle to the mainstream flow other than 90° for deflecting the streamlines of the boundary layer air along a corresponding extended transverse region at the lee side of said element causing a concave deflection of some of the streamlines within the boundary layer spaced from said element and a flow reversal of others of the boundary layer streamlines projected on a plane normal to the axis of said element closer to said lee side resulting in the formation of a vortex substantially within the dimensions of the original boundary layer.